US009650972B2

(12) United States Patent
Honda

(10) Patent No.: US 9,650,972 B2
(45) Date of Patent: May 16, 2017

(54) CONTROL DEVICE FOR AN INTERNAL COMBUSTION ENGINE

(71) Applicant: Mitsubishi Electric Corporation, Tokyo (JP)

(72) Inventor: Tetsuya Honda, Tokyo (JP)

(73) Assignee: Mistubishi Electric Corporation, Tokyo (JP)

( * ) Notice: Subject to any disclaimer, the term of this patent is extended or adjusted under 35 U.S.C. 154(b) by 296 days.

(21) Appl. No.: 14/628,474

(22) Filed: Feb. 23, 2015

(65) Prior Publication Data

US 2016/0061123 A1 Mar. 3, 2016

(30) Foreign Application Priority Data

Sep. 3, 2014 (JP) ................. 2014-178721

(51) Int. Cl.
| | |
|---|---|
| *F02D 41/00* | (2006.01) |
| *F01L 1/34* | (2006.01) |
| *F02D 41/14* | (2006.01) |
| *F02D 41/24* | (2006.01) |

(52) U.S. Cl.
CPC ............ *F02D 41/0002* (2013.01); *F01L 1/34* (2013.01); *F02D 41/0062* (2013.01); *F02D 41/0097* (2013.01); *F02D 41/1446* (2013.01); *F02D 41/1498* (2013.01); *F02D 41/2454* (2013.01); *F02D 2041/001* (2013.01); *F02D 2041/007* (2013.01); *F02D 2041/1433* (2013.01); *Y02T 10/18* (2013.01); *Y02T 10/42* (2013.01); *Y02T 10/47* (2013.01)

(58) Field of Classification Search
CPC ............... F02D 41/006; F02D 41/0062; F02D 41/0065; F02D 2041/0067; F02D 2041/007; F02D 2041/001; F02D 41/1438; F02D 41/1441; F02D 41/1446; F02D 41/1447; F02D 41/1448
USPC ..................................... 123/568.14
See application file for complete search history.

(56) References Cited

U.S. PATENT DOCUMENTS

| | | | | |
|---|---|---|---|---|
| 2004/0139949 A1* | 7/2004 | Koseki | ...................... | F01L 1/20 123/568.14 |
| 2005/0096833 A1* | 5/2005 | Nakazawa | .......... | F02D 41/0002 701/102 |

(Continued)

FOREIGN PATENT DOCUMENTS

JP         2009-150288 A         7/2009

*Primary Examiner* — Thomas Moulis
(74) *Attorney, Agent, or Firm* — Sughrue Mion, PLLC; Richard C. Turner

(57) ABSTRACT

Provided is a control device for an internal combustion engine, which is capable of suppressing occurrence of knocking due to pre-ignition and occurrence of misfire even when an operating state in a previous cycle changes in a subsequent cycle. When a ratio of change in heat of air-fuel mixture, which is an index indicating how a heat of air-fuel mixture in the previous cycle changes in the subsequent cycle, does not fall within an allowable range, a variable valve control mechanism capable of changing a valve-closing timing of an exhaust valve for adjusting an internal EGR gas amount is controlled by using an optimum value of exhaust valve close (EVC) timing derived by correcting a set valve-closing timing of the exhaust valve so that the ratio of change in heat of air-fuel mixture falls within the allowable range.

12 Claims, 6 Drawing Sheets

(56) References Cited

U.S. PATENT DOCUMENTS

| | | | | |
|---|---|---|---|---|
| 2007/0062179 A1* | 3/2007 | Leone | ............... | F02D 13/0219 |
| | | | | 60/285 |
| 2008/0092862 A1* | 4/2008 | Kitamura | ............... | F01L 1/267 |
| | | | | 123/568.14 |
| 2008/0209906 A1* | 9/2008 | Inoue | ............... | F02D 41/0007 |
| | | | | 60/605.2 |
| 2008/0283028 A1* | 11/2008 | Endo | ............... | F02D 13/0276 |
| | | | | 123/568.14 |
| 2009/0248271 A1* | 10/2009 | Kuzuyama | ............... | F02B 39/10 |
| | | | | 701/103 |
| 2011/0231081 A1* | 9/2011 | Suzuki | ............... | F01N 11/005 |
| | | | | 701/104 |
| 2014/0261344 A1* | 9/2014 | Makino | ............... | F02D 41/1446 |
| | | | | 123/568.26 |
| 2015/0377167 A1* | 12/2015 | Flohr | ............... | F02D 41/1446 |
| | | | | 701/104 |

* cited by examiner

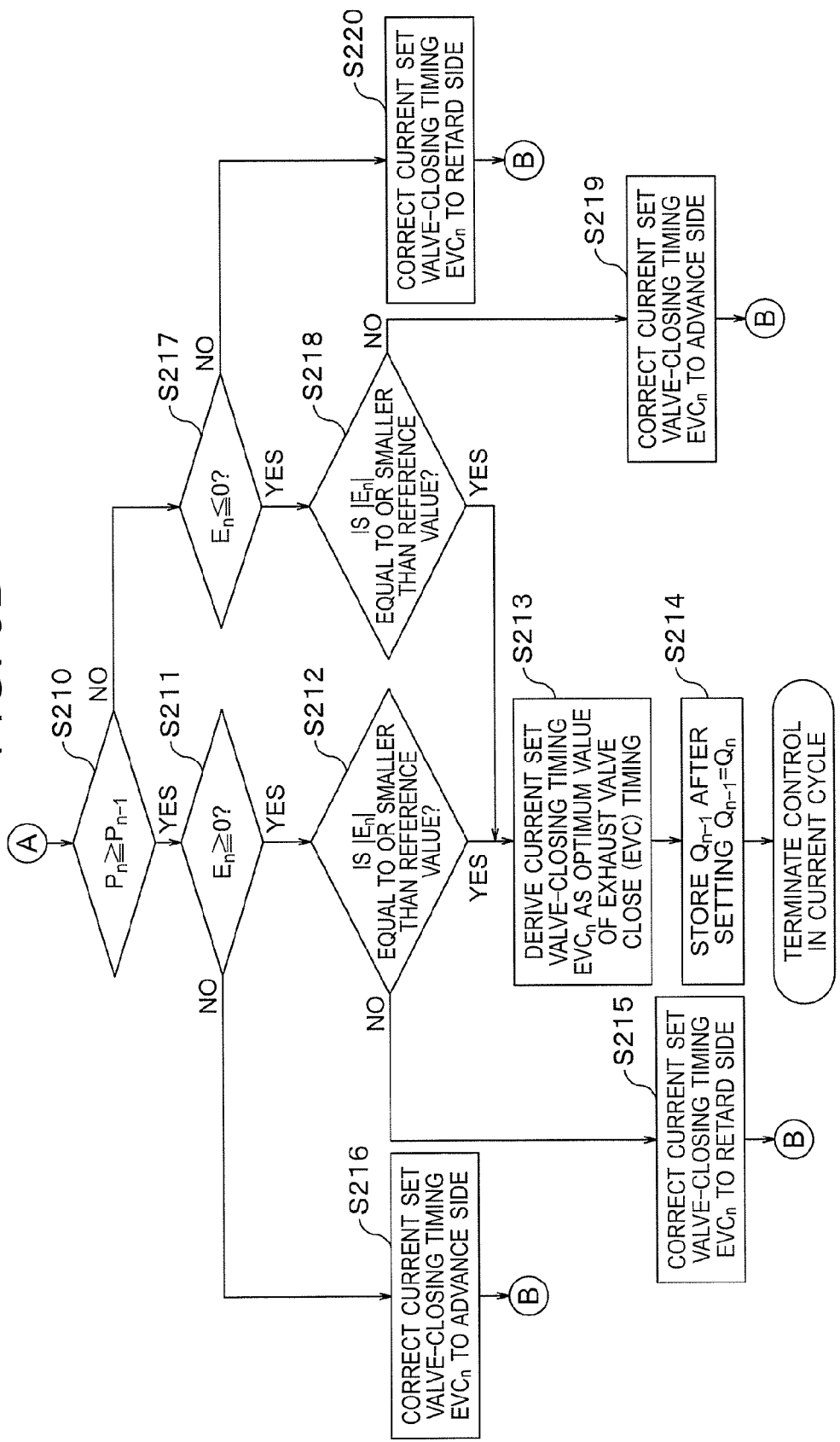

CONTROL DEVICE FOR AN INTERNAL COMBUSTION ENGINE

BACKGROUND OF THE INVENTION

1. Field of the Invention

The present invention relates to a control device for an internal combustion engine, for controlling the amount of internal EGR gas that is a burnt gas remaining in a cylinder.

2. Description of the Related Art

In a related-art spark-ignition internal combustion engine using gasoline as a fuel, a thermal efficiency is high in an operating region in which an internal combustion engine load is middle to high. On the other hand, the thermal efficiency is low in an operating region in which the internal combustion engine load is relatively low. The operating region with the relatively low internal combustion engine load is frequently used for automobiles. As a factor of reduction in thermal efficiency under the low load condition described above, the following is given. Specifically, a throttle valve is closed to reduce an air amount to be taken into a cylinder. As a result, negative work (that is, a pumping loss) increases or an effective compression ratio is lowered due to reduction in air amount itself.

Reduction in pumping loss and improvement of the effective compression ratio can be achieved by opening the throttle valve to increase an amount of intake-air. In a case where gasoline is used as the fuel, however, an air-fuel mixture obtained by mixing gasoline with air of a certain amount or larger with respect to an amount of the gasoline does not burn. Therefore, the amount of intake-air cannot be greatly increased. Thus, a great effect of improving the thermal efficiency is not obtained. However, when a temperature of intake air is high, a maximum air amount in the combustible air-fuel mixture increases. Therefore, the improvement of the thermal efficiency can be expected. However, means for heating the intake air is required. Thus, a device configuration becomes complex.

Therefore, as means for reducing the pumping loss and improving the effective compression ratio, a technology of leaving a combustion gas in the cylinder in a state in which the amount of intake-air is maintained is used. Although the thus left combustion gas scarcely contains oxygen, oxygen that is necessary for the combustion of gasoline is ensured in the intake air. Therefore, the air-fuel mixture can be combusted by the combustion gas at high temperature, which is left in the cylinder. Leaving the combustion gas in the cylinder is hereinafter referred to as "internal EGR", and the combustion gas left in the cylinder is hereinafter referred to as "internal EGR gas".

Further, a total gas amount of the air-fuel mixture is increased by the addition of the combustion gas to gasoline and air due to the internal EGR. Therefore, the pumping loss can be reduced, while the effective compression ratio can be improved. As a result, even if the internal combustion engine operates under the low load condition, a high thermal efficiency can be achieved. Further, a temperature of the internal EGR gas is high. Therefore, a part of thermal energy, which is hitherto disposed of as an exhaust gas, is recovered in a subsequent combustion cycle. The recovery of thermal energy also contributes to the improvement of the thermal efficiency.

In order to realize the internal EGR that provides the effects of improving the thermal efficiency as described above, advancing a valve-closing timing of an exhaust valve is effective. In some cases, however, the temperature of the air-fuel mixture at the time of compression changes to cause pre-ignition or misfire depending on a difference of the temperature of the combustion gas and the temperature and amount of the intake air. Therefore, in order to prevent both the pre-ignition and the misfire from occurring, the internal EGR gas amount is required to be adjusted properly by controlling the valve-closing timing of the exhaust valve in accordance with an operating state.

Therefore, as means for adjusting the internal EGR gas amount as described above, there has been proposed, for example, a technology of controlling the valve-closing timing of the exhaust valve to a preset timing in accordance with the operating state of the internal combustion engine (see, for example, Japanese Patent Application Laid-open No. 2009-150288). Further, in the related art described in Japanese Patent Application Laid-open No. 2009-150288, data of the valve-closing timing of the exhaust valve, which is prepared in advance for each combination of a shaft rotation speed of the internal combustion engine and the internal combustion engine load (hereinafter referred to as "combustion load"), is used for the control. In addition, control for correcting the valve-closing timing in accordance with a cooling-water temperature for the internal combustion engine is also performed.

However, the related art has the following problems.

In the related art described in Japanese Patent Application Laid-open No. 2009-150288, the valve-closing timing of the exhaust valve is controlled by referring to a database that is acquired in advance under conditions where the shaft rotation speed and the combustion load are kept constant. Specifically, under the operating condition with one combination of the shaft rotation speed and the combustion load, the valve-closing timing of the exhaust valve at which the internal EGR gas amount becomes optimum in a case where the combustion gas having the stabilized temperature under the operating condition is left in the cylinder is prepared as the database.

Here, the internal EGR gas actually remaining in the cylinder in the current cycle corresponds to the combustion gas that is derived in the combustion in the same cylinder in the previous cycle, specifically, one cycle before the current cycle, and remains in the cylinder. Thus, in a process in which the shaft rotation speed or the combustion load in the previous cycle changes in the current cycle, a difference is derived between the internal EGR gas temperature that is taken into consideration in the database so as to correspond to the shaft rotation speed and the combustion load in the current cycle and the internal EGR gas temperature actually remaining in the cylinder in the current cycle (specifically, an exhaust gas temperature of the combustion gas derived in the previous cycle).

As the difference described above, for example, in a case where the temperature of the internal EGR gas actually remaining in the cylinder in the current cycle is higher than the internal EGR gas temperature that is taken into consideration in the database so as to correspond to the shaft rotation speed and the combustion load in the current cycle, the temperature of the air-fuel mixture at the time of compression becomes higher. Thus, there is a problem in that knocking due to pre-ignition occurs.

On the other hand, in a case where the temperature of the internal EGR gas actually remaining in the cylinder in the current cycle is lower than the internal EGR gas temperature that is taken into consideration in the database so as to correspond to the shaft rotation speed and the combustion load in the current cycle, the temperature of the air-fuel mixture at the time of compression becomes lower. Thus, there is a problem in that misfire occurs.

SUMMARY OF THE INVENTION

The present invention has been made to solve the problems described above, and therefore has an object to provide a control device for an internal combustion engine, which is capable of suppressing occurrence of knocking due to pre-ignition and occurrence of misfire even when an operating state in a previous cycle changes in a subsequent cycle.

According to one embodiment of the present invention, there is provided a control device for an internal combustion engine, which is configured to control a variable valve control mechanism capable of changing a valve-closing timing of an exhaust valve and controlling the variable valve control mechanism so that the exhaust valve is closed at an optimum value of exhaust valve close (EVC) timing derived by optimizing a set valve-closing timing of the exhaust valve for each cycle, the control device including: a parameter acquiring section configured to acquire an exhaust gas temperature, an exhaust pressure, an intake-air temperature, and an amount of intake-air of the internal combustion engine; a heat of air-fuel mixture calculating section configured to execute first processing of calculating a heat of an air-fuel mixture as a heat of air-fuel mixture from a relationship between an internal EGR gas heat and an intake-air heat, the internal EGR gas heat being calculated by calculating a combustion-chamber volume in accordance with a current set valve-closing timing, and calculating a heat of an internal EGR gas present in a combustion chamber based on a relationship between the calculated combustion-chamber volume, and the exhaust gas temperature and the exhaust pressure acquired by the parameter acquiring section, the intake-air heat being calculated by calculating a heat of intake air based on a relationship between the intake-air temperature and the amount of intake-air acquired by the parameter acquiring section; a ratio of change in heat of air-fuel mixture calculating section configured to execute second processing of calculating a ratio of change in heat of air-fuel mixture, the ratio of change in heat of air-fuel mixture being an index indicating how the heat of air-fuel mixture that is calculated by the heat of air-fuel mixture calculating section so as to correspond to the current set valve-closing timing in a current cycle changes from a heat of air-fuel mixture corresponding to an optimum value of exhaust valve close (EVC) timing derived in a previous cycle; and an optimum value of exhaust valve close (EVC) timing deriving section configured to execute third processing of determining whether or not the ratio of change in heat of air-fuel mixture falls within a preset allowable range, and execute fourth processing of deriving the current set valve-closing timing as the optimum value of exhaust valve close (EVC) timing in the current cycle when it is determined that the ratio of change in heat of air-fuel mixture falls within the allowable range, and deriving a corrected set valve-closing timing by correcting the current set valve-closing timing so that the ratio of change in heat of air-fuel mixture falls within the allowable range to update the current set valve-closing timing as the corrected set valve-closing timing when it is determined that the ratio of change in heat of air-fuel mixture does not fall within the allowable range, in which the first processing executed by the heat of air-fuel mixture calculating section, the second processing executed by the ratio of change in heat of air-fuel mixture calculating section, and the third processing and the fourth processing executed by the optimum value of exhaust valve close (EVC) timing deriving section are repeatedly executed until it is determined that the ratio of change in heat of air-fuel mixture falls within the allowable range by using the updated current set valve-closing timing.

According to one embodiment of the present invention, when the ratio of change in heat of air-fuel mixture, which is the index indicating how the heat of air-fuel mixture in the previous cycle changes in the subsequent cycle, does not fall within the allowable range, the variable valve control mechanism capable of changing the valve-closing timing of the exhaust valve for adjusting the internal EGR gas amount is controlled by using the optimum value of exhaust valve close (EVC) timing derived by correcting the set valve-closing timing of the exhaust valve so that the ratio of change in heat of air-fuel mixture falls within the allowable range. In this manner, the control device for an internal combustion engine, which is capable of suppressing the occurrence of knocking due to pre-ignition and the occurrence of misfire even when the operating state in the previous cycle changes in the subsequent cycle, can be obtained.

BRIEF DESCRIPTION OF THE DRAWINGS

FIG. 3B is a flowchart illustrating the operation of the control device for an internal combustion engine according to the second embodiment of the present invention.

DETAILED DESCRIPTION OF THE PREFERRED EMBODIMENTS

Now, a control device for an internal combustion engine according to exemplary embodiments of the present invention is described referring to the accompanying drawings. In the illustration of the drawings, the same components are denoted by the same reference symbols, and the overlapping description thereof is herein omitted. The present invention is applicable to an internal combustion engine in which an intake valve is opened after closure of an exhaust valve under at least some operating conditions.

First Embodiment

Figure 4:
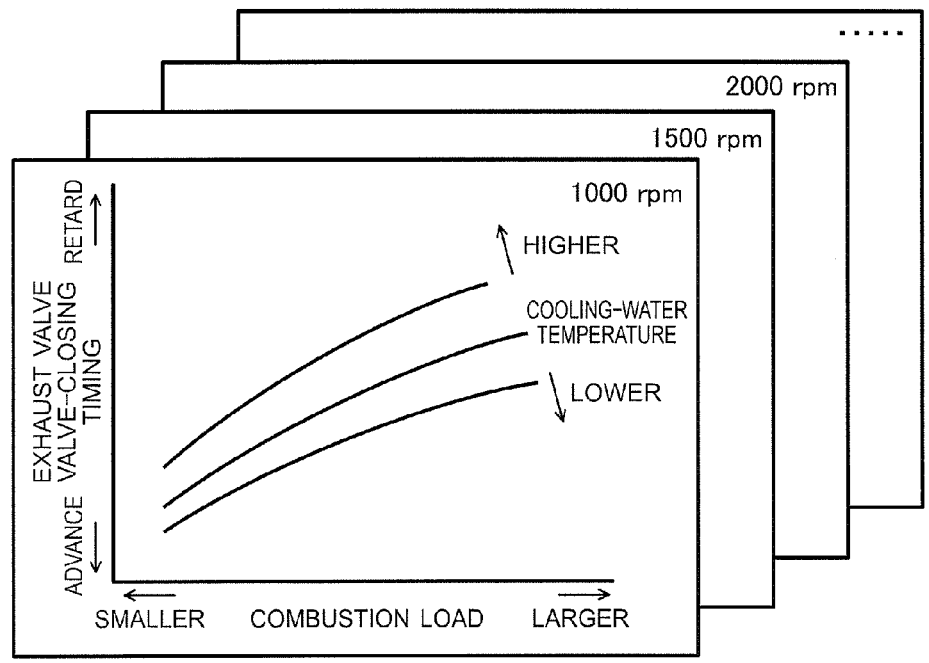
FIG. 4 is an exemplary diagram showing an example of a database for setting a valve-closing timing of an exhaust valve with the application of the related art.

First, in order to clarify technical features of the present invention, a problem of an internal combustion engine with the application of the related art described in Japanese Patent Application Laid-open No. 2009-150288, which the inventors of the present invention newly focus on, is described referring to FIG. 4. FIG. 4 is an explanatory diagram showing an example of a database for setting a valve-closing timing of an exhaust valve with the application of the related art.

In this case, an internal EGR gas is a part of a combustion gas derived in a previous cycle, which is left in a combustion chamber. Further, as a result of mixture of the internal EGR gas and air and a fuel that are newly taken and supplied in a current cycle, an air-fuel mixture is formed. Combustion of the thus formed air-fuel mixture is significantly affected by a temperature and a density of the air-fuel mixture.

The internal EGR gas temperature is high relative to an air temperature and a combustion temperature. Therefore, the effects of the internal EGR gas temperature on the air-fuel mixture temperature are significant. Further, a difference in the amount of internal EGR gas leads to a difference in the amount of air-fuel mixture. Therefore, the amount of internal EGR gas affects the density of the air-fuel mixture.

Specifically, in a case where the internal EGR gas temperature increases or the internal EGR gas amount increases in a certain steady combustion state due to some factor, the air-fuel mixture temperature becomes higher than that in the steady state. In such a case, a combustion reaction rate increases. As a result, knocking due to pre-ignition occurs.

On the other hand, in a case where the internal EGR gas temperature drops or the internal EGR gas amount decreases in a certain steady combustion state due to some factor, the air-fuel mixture temperature becomes lower than that in the steady state. In such a case, instability of the combustion becomes more significant. As a result, misfire occurs.

In order to suppress the occurrence of knocking due to pre-ignition and the occurrence of misfire as described above, the internal EGR gas amount is required to be controlled properly. Thus, in the related art described in Japanese Patent Application Laid-open No. 2009-150288, for example, the database shown in FIG. 4 for determining the valve-closing timing of the exhaust valve is used. As shown in FIG. 4, in the database, a shaft rotation speed, a combustion load, a cooling-water temperature, and the valve-closing timing of the exhaust valve are associated with each other. The cooling-water temperature herein indicates a temperature of engine cooling water (not shown) that circulates so as to come into contact with at least a part of a cylinder.

Specifically, an engine control device acquires the shaft rotation speed, the combustion load, and the cooling-water temperature so as to extract the valve-closing timing of the exhaust valve, which corresponds to the acquired parameters, from the database. Further, the engine control device controls an operation of an exhaust-valve driving mechanism so that the exhaust valve is closed at the thus extracted valve-closing timing, thereby properly setting the internal EGR gas amount.

Further, in a normal case, the database as shown in FIG. 4 is created based on information in a state in which the internal combustion engine is in a stable combustion state (specifically, a steady combustion state). Therefore, it can be said that the above-mentioned means for determining the valve-closing timing of the exhaust valve by referring to the database is effective for the steady combustion in which the shaft rotation speed of the internal combustion engine, the combustion load, and an exhaust gas temperature hardly change.

Specifically, in a case of the internal combustion engine that is operated under conditions where the shaft rotation speed and the combustion load hardly change, the internal EGR gas amount can be controlled properly with the application of the related art described in Japanese Patent Application Laid-open No. 2009-150288. Thus, an excellent combustion state can be maintained.

In a case of the internal combustion engine mounted in a vehicle, however, for example, when an inclination of a road surface on which the vehicle is running changes or when a driver of the vehicle requests to change a vehicle speed, the shaft rotation speed or the combustion load remarkably changes. As a result, the internal combustion engine is brought into a transient state. In such a case, the following problem occurs.

Specifically, in the internal combustion engine, a case where an operating state I in one cycle changes to an operating state II in a subsequent cycle is considered. The shaft rotation speed is N1 and the combustion load is P1 in the operating state I, whereas the shaft rotation speed is N2 and the combustion load is P2 in the operating state II. A throttle opening-degree is $\alpha 1$, the valve-closing timing of the exhaust valve is EVC1, and the exhaust gas temperature is TE1 in the operating state I, whereas the throttle opening-degree is $\alpha 2$, the valve-closing timing of the exhaust valve is EVC2, and the exhaust gas temperature is TE2 in the operating state II. Further, it is assumed that the throttle opening-degree is changed from $\alpha 1$ to $\alpha 2$ by an operation of an accelerator performed by a driver of the vehicle.

In the above-mentioned case, along with the change of the throttle opening-degree from $\alpha 1$ in the one cycle to $\alpha 2$ in the subsequent cycle, a fuel supply amount is controlled to be changed. As a result, the combustion load changes from P1 to P2. Further, the shaft rotation speed changes as a result of the combustion of the fuel whose supply amount has been changed. Thus, N1 is maintained as the shaft rotation speed at this point of time. The valve-closing timing EVC2 of the exhaust valve for the cycle subsequent to the cycle in the operating state I is extracted from the database for the shaft rotation speed N1 and the combustion load P2.

Here, a case where P1<P2, specifically, the combustion load in the one cycle increases in the subsequent cycle due to acceleration of the vehicle or the like is considered. As described above, the database is created based on the information in the steady combustion state. Thus, under the condition where the relationship TE1<TE2 is established for the exhaust gas temperature, the valve-closing timing EVC2 is extracted. However, the internal EGR gas to be left in the combustion chamber for the combustion in the cycle subsequent to the cycle in the operating state I is a combustion gas at the exhaust gas temperature TE1 that is obtained by the combustion in the cycle in the operating state I. In comparison with a case where the amount of combustion gas at the exhaust gas temperature TE2, which is determined by the valve-closing timing EVC2, is left, the air-fuel mixture temperature becomes lower in a case where the amount of combustion gas at the exhaust gas temperature TE1 lower than the exhaust gas temperature TE2, which is determined by the valve-closing timing EVC2, is left. The lowered air-fuel mixture temperature results in instability of the combustion that leads to misfire.

Therefore, in the above-mentioned case, a larger amount of internal EGR gas is required to be left in the combustion chamber by correcting the valve-closing timing of the exhaust valve to an advance side of the valve-closing timing EVC2 in order to increase the air-fuel mixture temperature so as to prevent the occurrence of misfire.

On the other hand, in a case where P1>P2 is established, specifically, the combustion load in the one cycle decreases in the subsequent cycle due to deceleration of the vehicle or the like, the air-fuel mixture temperature increases in contrast to the above-mentioned case, which results in knocking due to pre-ignition.

Therefore, in the above-mentioned case, a smaller amount of internal EGR gas is required to be left in the combustion chamber by correcting the valve-closing timing of the exhaust valve to a retard side of the valve-closing timing EVC2 in order to lower the air-fuel mixture temperature so as to prevent the occurrence of knocking due to pre-ignition.

In view of the consideration described above, the present invention focuses on the problem in that the knocking due to pre-ignition or the misfire occurs in the internal combustion engine to which the related art described in Japanese Patent Application Laid-open No. 2009-150288 is applied in the case where the operating state in the one cycle changes in the subsequent cycle.

Therefore, in order to solve the problem newly focused on in the present invention, the present invention provides a control device for an internal combustion engine, which is capable of suppressing the occurrence of knocking due to pre-ignition and the occurrence of misfire by properly controlling the valve-closing timing of the exhaust valve for adjusting the internal EGR gas amount based on a ratio of change in heat of air-fuel mixture that is an index indicating how a heat of air-fuel mixture in a previous cycle changes in a subsequent cycle even in the case where the operating state in the previous cycle changes in the current cycle.

Figure 1:
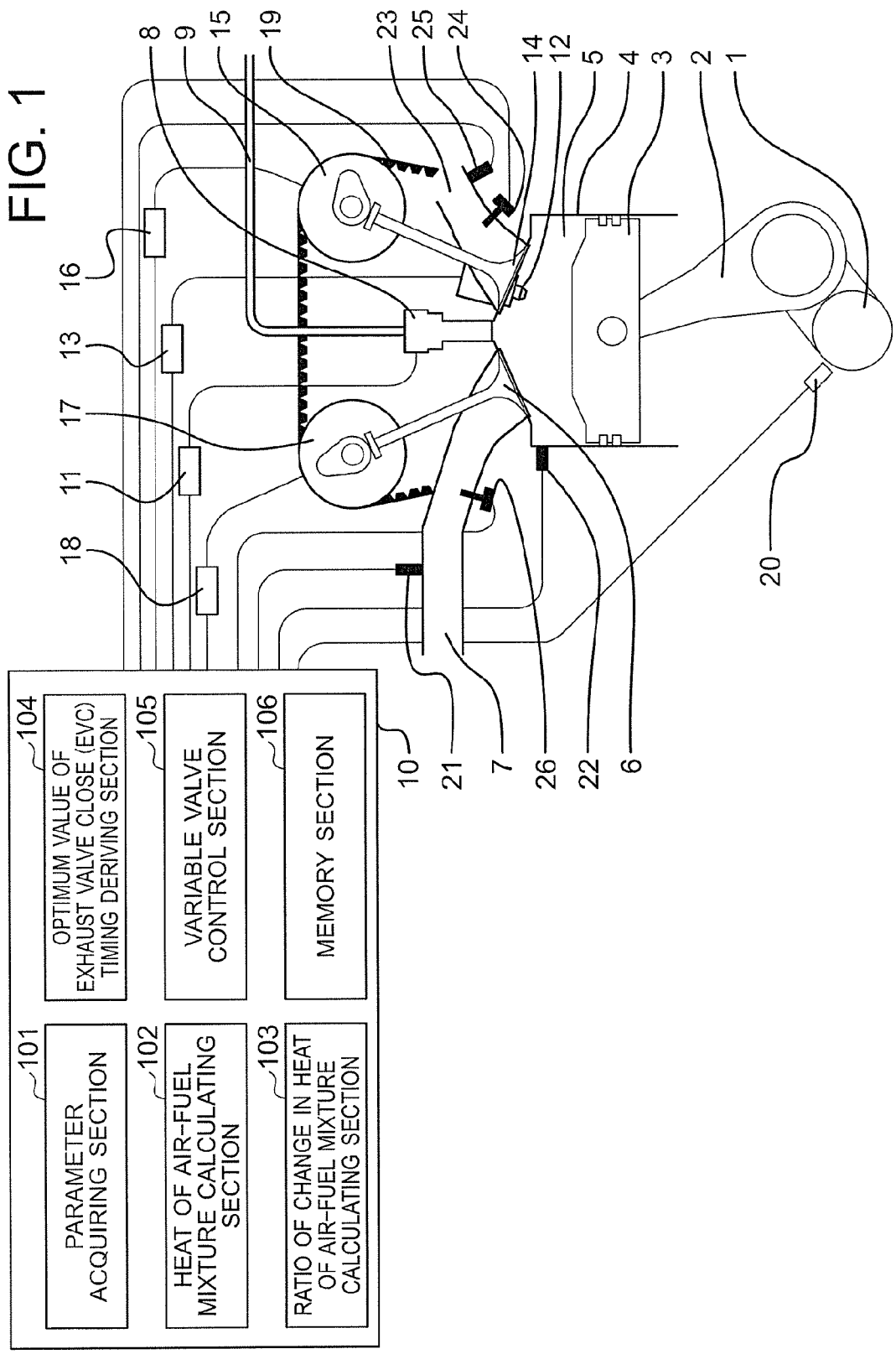
FIG. 1 is a configuration diagram illustrating an internal combustion engine according to a first embodiment of the present invention.

Next, the control device for an internal combustion engine according to a first embodiment of the present invention is described referring to FIG. 1. FIG. 1 is a configuration diagram of the internal combustion engine according to the first embodiment of the present invention. Although an internal combustion engine used for driving a vehicle or the like generally includes a plurality of combustion chambers, a configuration of only one of the plurality of combustion chambers is illustrated so as to simplify the description of an operation.

In FIG. 1, the internal combustion engine of the first embodiment includes an output-shaft crank 1, a connecting rod 2, a piston 3, a cylinder 4, a combustion chamber 5, an intake valve 6, an intake pipe 7, a fuel injection valve 8, a fuel-supply pipe 9, an engine control device 10, a fuel injection control device 11, a spark plug 12, an ignition energy supply device 13, an exhaust valve 14, an exhaust-valve driving mechanism 15, an exhaust-valve control device 16, an intake-valve driving mechanism 17, an intake-valve control device 18, a timing belt 19, a shaft rotation speed sensor 20, an intake-pressure sensor 21, an in-cylinder pressure sensor 22, an exhaust pipe 23, an exhaust gas temperature sensor 24, an exhaust-pressure sensor 25, and an intake-air temperature sensor 26. The exhaust-valve driving mechanism 15, the exhaust-valve control device 16, the intake-valve driving mechanism 17, and the intake-valve control device 18 construct a variable valve control mechanism capable of changing at least a valve-closing timing of the exhaust valve 14.

Further, the engine control device 10 includes a parameter acquiring section 101, a heat of air-fuel mixture calculating section 102, a ratio of change in heat of air-fuel mixture calculating section 103, an optimum value of exhaust valve close (EVC) timing deriving section 104, a variable valve control section 105, and a memory section 106.

Next, an operation during each of four strokes, that is "intake", "compression", "expansion (combustion)", and "exhaust" strokes that construct one cycle in the internal combustion engine of the first embodiment is described. During each of the strokes, the piston 3 performs reciprocating movement along the cylinder 4 by an action of the connecting rod 2 along with the rotation of the output-shaft crank 1. As a result, a volume of the combustion chamber 5 changes.

First, during the intake stroke, the intake valve 6 starts gradually opening in the vicinity of a state in which the piston 3 is most deeply pushed so as to pull out the piston 3. As a result, air is taken into the combustion chamber 5 through the intake pipe 7. The fuel is injected and fed to the combustion chamber 5 by the fuel injection valve 8 during the intake stroke.

The fuel is fed through the fuel-supply pipe 9 after being pressurized to about 200 atmospheres by a fuel boost pump (not shown) or the like. The injection supply of the fuel is controlled by the fuel injection control device 11 through reception of information about an injection amount and an injection timing, which are determined by computation processing performed in the engine control device 10, and by the subsequent supply of driving energy to the fuel injection valve 8.

Subsequently, during the compression stroke, the intake valve 6 starts gradually closing in the middle of the process of pulling out the piston 3. When the intake valve 6 is fully closed in the vicinity of a position where the push of the piston 3 is started again, air taken into the combustion chamber 5 and the fuel fed to the combustion chamber 5 are compressed while continuing being mixed.

In the related-art internal combustion engine in which the combustion is started by spark ignition, the spark plug 12 is installed so as to project into the combustion chamber 5. Further, the spark plug 12 releases electric energy supplied from the ignition energy supply device 13 before or after time at which the piston 3 is most deeply pushed, thereby igniting the air-fuel mixture (not shown) that is a mixture of compressed air and a fuel in the combustion chamber 5.

Next, when the air-fuel mixture is ignited during the combustion stroke, a pressure in the combustion chamber 5 abruptly increases so that a force for pushing back the piston 3 acts. Therefore, a turning force is derived in the output-shaft crank 1 by the connecting rod 2.

Subsequently, during the exhaust stroke, the exhaust valve 14 starts gradually opening in the vicinity of a position at which the piston 3 is most deeply pushed back. As a result, a combustion gas is discharged from the combustion chamber 5.

In the internal combustion engine according to the first embodiment, the internal EGR is realized by leaving a part of combustion gas in the combustion chamber 5 instead of exhausting the part of combustion gas. Therefore, the exhaust-valve control device 16 for controlling the exhaust-valve driving mechanism 15 for driving the exhaust valve 14 in accordance with a control command from the engine control device 10 is provided. With the configuration described above, the valve-closing timing of the exhaust valve 14 can be controlled to be changed in accordance with the operating state of the internal combustion engine.

Further, for example, when the valve-closing timing of the exhaust valve 14 is controlled to be advanced ahead of top dead center (TDC), the combustion gas left in the combustion chamber 5 is likely to flow back to the intake pipe 7 at the time of opening the intake valve 6. In order to suppress the backflow described above, the intake-valve control device 18 for controlling the intake-valve driving mechanism 17 for driving the intake valve 6 in accordance with a control command from the engine control device is provided. With the configuration described above, a valve-opening timing of the intake valve 6 can be controlled to be changed so as to prevent the combustion gas left in the combustion chamber 5 from flowing back to the intake pipe 7.

The exhaust-valve driving mechanism 15 and the intake-valve driving mechanism 17 rotationally operate at a half of a rotation speed of the output-shaft crank 1 by the timing belt 19.

Figure 2A:
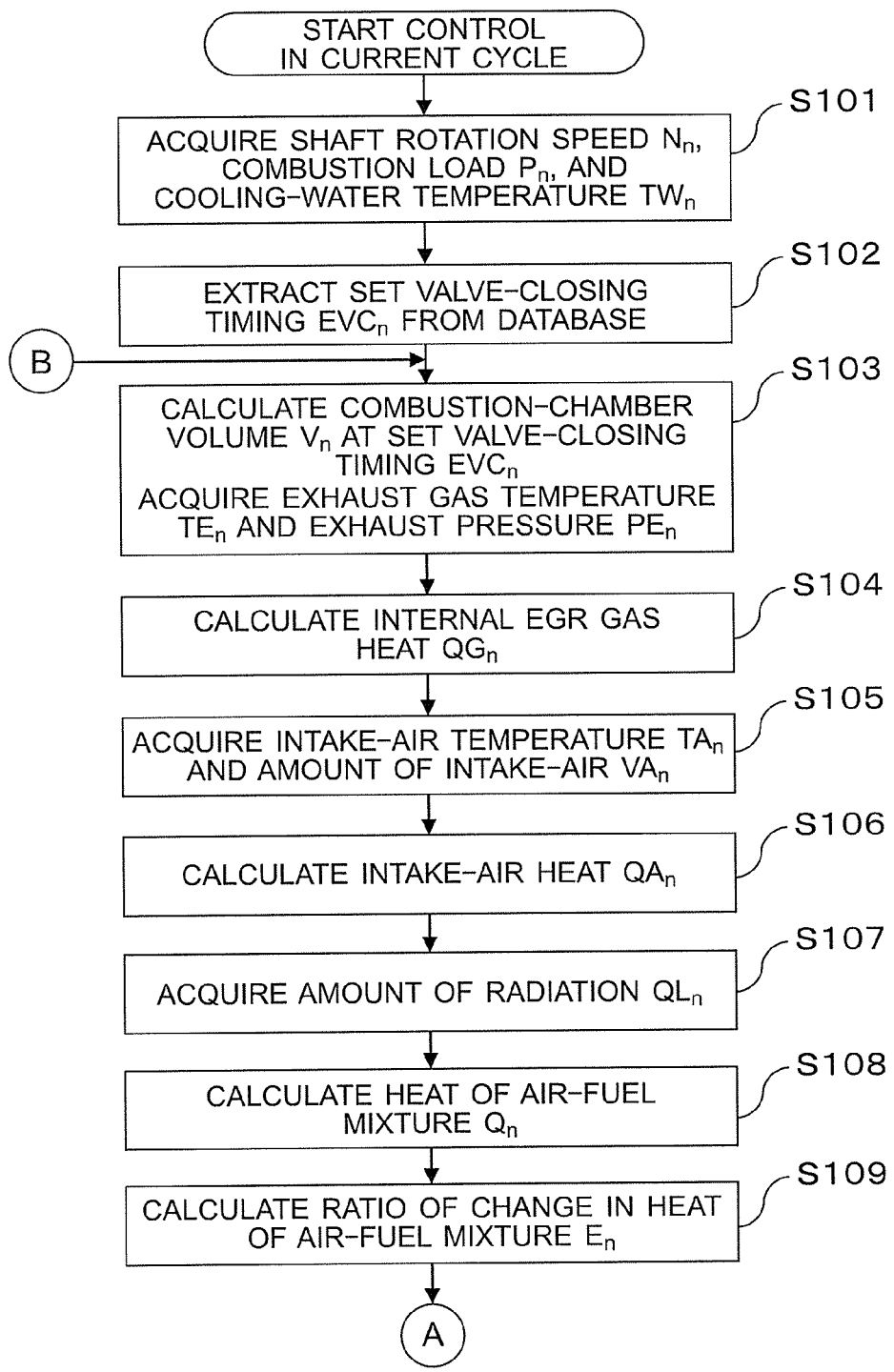
FIG. 2A is a flowchart illustrating an operation of a control device for an internal combustion engine according to the first embodiment of the present invention.
Figure 2B:
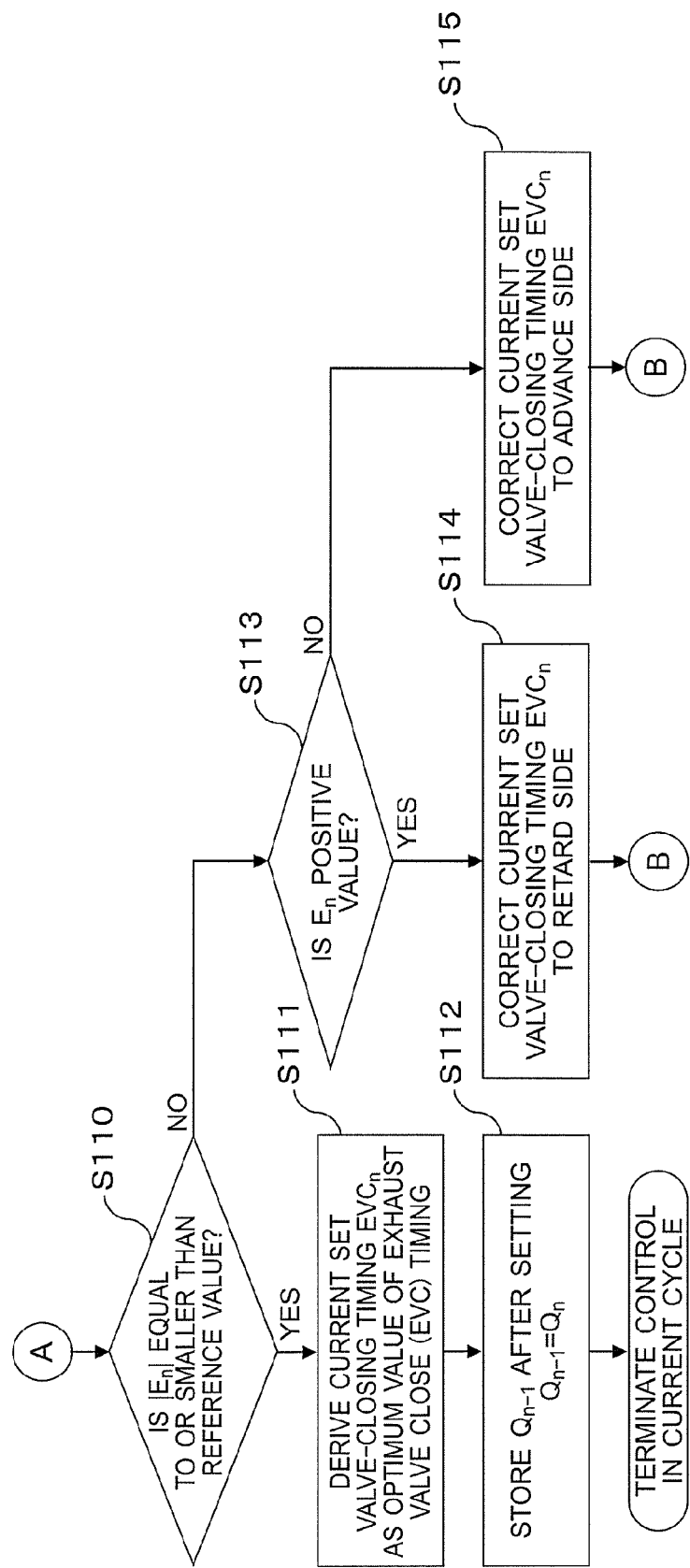
FIG. 2B is a flowchart illustrating the operation of the control device for an internal combustion engine according to the first embodiment of the present invention.

Next, control over the valve-closing timing of the exhaust valve, which is performed by the control device for an internal combustion engine according to the first embodiment, is described referring to flowcharts of FIGS. 2A and 2B. FIGS. 2A and 2B are flowcharts illustrating an operation of the control device for an internal combustion engine according to the first embodiment of the present invention. In the following description, a physical quantity such as the shaft rotation speed and the combustion load is followed by a suffix. The suffix n denotes a physical quantity in the current cycle, and the suffix n−1 denotes a physical quantity in the previous cycle. FIGS. 2A and 2B illustrate a single flowchart divided into two parts. Thus, the flowchart of FIG. 2A and the flowchart of FIG. 2B are continuous.

After the start of the control in the current cycle, in Step 101, the parameter acquiring section 101 acquires a current shaft rotation speed $N_n$, a current combustion load $P_n$, and a current cooling-water temperature $TW_n$. Then, the processing proceeds to Step S102.

Specifically, the parameter acquiring section 101 acquires, for example, the shaft rotation speed detected by the shaft rotation speed sensor 20 provided to the output-shaft crank 1 or the like as the shaft rotation speed N. Further, the parameter acquiring section 101 acquires the combustion load $P_n$ by, for example, estimating the combustion load $P_n$ from the intake pressure detected by the intake-pressure sensor 21 provided to the intake pipe 7. Alternatively, the parameter acquiring section 101 may acquire the combustion load $P_n$ by estimating the combustion load $P_n$ from the fuel amount injected from the fuel injection valve 8, which is scheduled in the current cycle. Further, the parameter acquiring section 101 acquires, for example, a representative temperature of the engine cooling water circulating so as to come into contact with at least a part of the cylinder 4, which is detected by a water-temperature sensor (not shown), as the cooling-water temperature $TW_n$.

In Step S102, the optimum value of exhaust valve close (EVC) timing deriving section 104 extracts the valve-closing timing of the exhaust valve 14, which corresponds to the shaft rotation speed $N_n$, the combustion load $P_n$, and the cooling-water temperature $TW_n$ acquired by the parameter acquiring section 101, as a set valve-closing timing $EVC_n$ from the database stored in the memory section 106, which is shown in FIG. 4 referred to above. The database is stored in the memory section 106.

As described above, the control device for an internal combustion engine can temporarily determine the set valve-closing timing $EVC_n$ in the current cycle by executing Steps S101 and S102. The control device for an internal combustion engine executes the following steps to properly correct the temporarily determined set valve-closing timing $EVC_n$, ultimately deriving an optimum value of exhaust valve close (EVC) timing. The case where the related art described in Japanese Patent Application Laid-open No. 2009-150288 is applied as means for temporarily determining the set valve-closing timing $EVC_n$ in the current cycle is described. However, the means for temporarily determining the set valve-closing timing $EVC_n$ in the current cycle is not limited thereto. The set valve-closing timing $EVC_n$ in the current cycle may be temporarily determined by the application of other known related art.

In Step S103, the heat of air-fuel mixture calculating section 102 calculates a combustion-chamber volume $V_n$ at the set valve-closing timing $EVC_n$, whereas the parameter acquiring section 101 acquires an exhaust gas temperature $TE_n$ and an exhaust pressure $PE_n$. Then, the processing proceeds to Step S104. Subsequently, in Step S104, the heat of air-fuel mixture calculating section 102 calculates a heat of the internal EGR gas present in the combustion chamber 5 at the set valve-closing timing $EVC_n$ as an internal EGR gas heat $QG_n$. Then, the processing proceeds to Step S105.

Here, the combustion-chamber volume $V_n$ at the set valve-closing timing $EVC_n$ is calculated in accordance with (Expression 1) described below.

$$V_n = Ss \times Lp + Vt \quad \text{(Expression 1)}$$

In (Expression 1), Ss represents a sectional area of the combustion chamber 5, Lp represents a piston position from the TDC at the set valve-closing timing $EVC_n$, and Vt represents a combustion-chamber volume at the TDC.

Further, the exhaust gas temperature $TE_n$ and the exhaust pressure $PE_n$ are information necessary for calculating the internal EGR gas heat $QG_n$ at the set valve-closing timing $EVC_n$. Therefore, in theory, values of the exhaust gas temperature $TE_n$ and the exhaust pressure $PE_n$ at the time at which the valve-closing timing of the exhaust valve 14 coincides with the set valve-closing timing $EVC_n$ are required. In the first embodiment, however, the internal EGR gas heat $QG_n$ is required to be calculated before the valve-closing timing of the exhaust valve 14 coincides with the set valve-closing timing $EVC_n$. Thus, by using the exhaust gas temperature $TE_n$ and the exhaust pressure $PE_n$ that are acquired by the parameter acquiring section 101 immediately before the internal EGR gas heat $QG_n$ is calculated, the internal EGR gas heat $QG_n$ is calculated in accordance with (Expression 2) described below.

$$QG_n = VG_n \times TE_n \times Cg \quad \text{(Expression 2)}$$

In (Expression 2), $VG_n$ represents an internal EGR gas amount calculated by (Expression 3) described below, and Cg represents a specific heat of the internal EGR gas.

$$VG_n = (PE_n \times V_n)/(Rg \times TE_n) \quad \text{(Expression 3)}$$

In (Expression 3), Rg represents a gas constant.

The parameter acquiring section 101 acquires, for example, the exhaust gas temperature detected by the exhaust gas temperature sensor 24 inserted into the exhaust pipe 23 as the exhaust gas temperature $TE_n$ and acquires the exhaust pressure detected by the exhaust-pressure sensor 25 provided to the exhaust pipe 23 as the exhaust pressure $PE_n$.

In Step S105, the parameter acquiring section 101 acquires an intake-air temperature $TA_n$ and an amount of intake-air $VA_n$. Then, the processing proceeds to Step S106. Subsequently, in Step S106, the heat of air-fuel mixture calculating section 102 calculates a heat of intake air as an intake-air heat $QA_n$. Then, the processing proceeds to Step S107.

Here, the intake-air heat $QA_n$ is calculated in accordance with (Expression 4) described below.

$$QA_n = VA_n \times TA_n \times Cg \quad \text{(Expression 4)}$$

In (Expression 4), Cg is a specific heat of the intake air.

Further, the parameter acquiring section 101 acquires, for example, the intake-air temperature detected by the intake-air temperature sensor 26 inserted into the intake pipe 7 as the intake-air temperature $TA_n$. Further, the parameter acquiring section 101 acquires, for example, the amount of intake-air $VA_n$ by estimating the amount of intake-air $VA_n$ from the relationship between the fuel amount that is scheduled to be injected from the fuel injection valve 8 in the current cycle and a density of the air-fuel mixture formed in the current cycle. Alternatively, a database in which the intake pressure, the shaft rotation speed, and the amount of intake-air are associated with each other may be stored in the memory section 106 so that the parameter acquiring section 101 acquires the amount of intake-air $VA_n$ by extracting the amount of intake-air $VA_n$ corresponding to the intake pressure detected by the intake-pressure sensor 21 and the shaft rotation speed detected by the shaft rotation speed sensor 20 from the database.

Here, the sum of the internal EGR gas heat $QG_n$ and the intake-air heat $QA_n$ is a heat of the air-fuel mixture at a timing at which the intake valve 6 is closed. Further, as a result of the movement of the piston 3 to the TDC in a state in which the intake valve 6 and the exhaust valve 14 are both closed, the air-fuel mixture is compressed to increase the air-fuel mixture temperature to be ready for an ignition timing. In a normal internal combustion engine, however, cooling using cooling water is mainly performed. Therefore, the heat is removed from the air-fuel mixture. Thus, the heat of the air-fuel mixture decreases before the ignition timing. Accordingly, Step S107 is provided so as to more accurately estimate the heat of the air-fuel mixture by taking not only the internal EGR gas heat $QG_n$ and the intake-air heat $QA_n$ into consideration but also the heat removed from the air-fuel mixture due to cooling into consideration.

In Step S107, the parameter acquiring section 101 acquires the heat removed from the air-fuel mixture due to cooling as an amount of radiation $QL_n$ from the air-fuel mixture. Then, the processing proceeds to Step S108.

The parameter acquiring section 101 acquires the amount of radiation $QL_n$ by estimating the amount of radiation $QL_n$ by the following means, for example. Specifically, the heat of the air-fuel mixture is removed by a wall surface of the combustion chamber 5. Therefore, the amount of radiation $QL_n$ can be estimated from a change in state of the temperature of the cooling water flowing in the vicinity of the wall surface. Specifically, a flow rate of the cooling water flowing in the vicinity of the wall surface is obtained in advance. A cooling-water temperature Twin when the cooling water flows into a portion to be cooled and a cooling-water temperature TWout when the cooling water flows out of the portion to be cooled are detected by the water-temperature sensor. By using the detection values, the amount of radiation $QL_n$ is calculated in accordance with (Expression 5) described below. Specifically, the amount of radiation $QL_n$ is estimated from the flow rate of the cooling water for cooling the internal combustion engine and the difference between a temperature of the cooling water before cooling the internal combustion engine and a temperature thereof after cooling the internal combustion engine.

$$QL_n = K0 \times Cw \times (TWout - TWin) \quad \text{(Expression 5)}$$

In (Expression 5), K0 is an adjustment factor that changes in accordance with the combustion load. In view of the fact that most of the heat migrating from the combustion chamber 5 to the cooling water is heat derived by the combustion, a ratio of heat migrating to the cooling water with the combustion in accordance with the combustion load and the shaft rotation speed and heat migrating from the air-fuel mixture to the cooling water before the start of the combustion is obtained in advance as the adjustment factor K0. In this manner, the amount of radiation $QL_n$ can be more accurately estimated.

In Step S108, the heat of air-fuel mixture calculating section 102 calculates the heat of the air-fuel mixture from the relationship between the internal EGR gas heat $QG_n$, the intake-air heat $QA_n$, and the amount of radiation $QL_n$ as a heat of air-fuel mixture $Q_n$. Then, the processing proceeds to Step S109.

Here, the heat of air-fuel mixture $Q_n$ is calculated in accordance with (Expression 6) described below.

$$Q_n = QG_n + QA_n - QL_n \quad \text{(Expression 6)}$$

As described above, the heat of air-fuel mixture calculating section 102 included in the control device for an internal combustion engine executes heat of air-fuel mixture calculation processing corresponding to the processing in Steps S103 to S108. As a result, the heat of air-fuel mixture $Q_n$ corresponding to the current set valve-closing timing $EVC_n$ in the current cycle can be calculated. Although the case where Step S107 is provided so as to more accurately estimate the heat of air-fuel mixture $Q_n$ is described as an example, Step S107 may be omitted. In this case, the heat of air-fuel mixture $Q_n$ corresponds to the sum of the internal EGR gas heat $QG_n$ and the intake-air heat $QA_n$.

In Step S109, the ratio of change in heat of air-fuel mixture calculating section 103 calculates a ratio of change in heat of air-fuel mixture $E_n$ that is an index indicating how the heat of air-fuel mixture $Q_n$ calculated in Step S108 (specifically, the heat of air-fuel mixture $Q_n$ corresponding to the current set valve-closing timing $EVC_n$) changes from a heat of air-fuel mixture $Q_{n-1}$ corresponding to the optimum value of exhaust valve close (EVC) timing derived in the previous cycle.

Here, the ratio of change in heat of air-fuel mixture $E_n$ is calculated in accordance with (Expression 7) described below.

$$E_n = \{(Q_n - Q_{n-1})/Q_{n-1}\} \times 100 \quad \text{(Expression 7)}$$

The heat of air-fuel mixture $Q_{n-1}$ corresponding to the optimum value of exhaust valve close (EVC) timing derived in the previous cycle is data stored in the memory section 106 in Step S112 described below. The details thereof are described later.

As described above, the ratio of change in heat of air-fuel mixture calculating section 103 included in the control device for an internal combustion engine executes ratio of change in heat of air-fuel mixture calculating processing corresponding to the processing in Step S109. As a result, the ratio of change in heat of air-fuel mixture that is the index indicating how the heat of air-fuel mixture calculated in Step S108 changes from the heat of air-fuel mixture corresponding to the optimum value of exhaust valve close (EVC) timing derived in the previous cycle can be calculated.

In Step S110, the optimum value of exhaust valve close (EVC) timing deriving section 104 determines whether or not an absolute value $|E_n|$ of the ratio of change in heat of air-fuel mixture $E_n$ is equal to or smaller than a preset reference value (value that is equal to or larger than 0%). In Step S110, when the optimum value of exhaust valve close (EVC) timing deriving section 104 determines that the absolute value $|E_n|$ is equal to or smaller than the reference value (specifically, YES), the processing proceeds to Step S111.

On the other hand, when the optimum value of exhaust valve close (EVC) timing deriving section 104 determines in Step S110 that the absolute value $|E_n|$ is larger than the reference value (specifically, NO), the optimum value of exhaust valve close (EVC) timing deriving section 104 then determines in Step S113 whether or not the ratio of change in heat of air-fuel mixture $E_n$ is a positive value.

When determining in Step S113 that the ratio of change in heat of air-fuel mixture $E_n$ is a positive value (specifically, YES), the optimum value of exhaust valve close (EVC) timing deriving section 104 corrects the current set valve-closing timing $EVC_n$ to the retard side in Step S114. Then, the processing returns to Step S103. In this case, after the current set valve-closing timing $EVC_n$ is updated by being replaced by the set valve-closing timing corrected to the retard side as described above, the processing after Step S103 is executed again. Specifically, by using the set valve-closing timing after the update by the correction to the retard side as described above, the processing after Step S103 is executed again.

On the other hand, when determining that the ratio of change in heat of air-fuel mixture $E_n$ is a negative value (specifically, NO), the optimum value of exhaust valve close (EVC) timing deriving section 104 corrects the current set valve-closing timing $EVC_n$ to the advance side in Step S115. Then, the processing returns to Step S103. In this case, after the current set valve-closing timing $EVC_n$ is updated by being replaced by the set valve-closing timing corrected to the advance side as described above, the processing after Step S103 is executed again. Specifically, by using the set valve-closing timing after the update by the correction to the advance side as described above, the processing after Step S103 is executed again.

As described above, when the absolute value $|E_n|$ is larger than the reference value and the ratio of change in heat of air-fuel mixture $E_n$ is the positive value, the heat of air-fuel mixture $Q_n$ in the current cycle changes in such a manner that the heat of air-fuel mixture $Q_n$ significantly increases from the heat of air-fuel mixture $Q_{n-1}$ in the previous cycle. Specifically, if the exhaust valve 14 is closed still at the current set valve-closing timing $EVC_n$ in the current cycle, the air-fuel mixture temperature at the time of compression becomes higher as compared with that in the previous cycle. As a result, the pre-ignition may occur due to the excessive heat of air-fuel mixture. Therefore, in order to suppress the pre-ignition described above, in Step 114, the current set valve-closing timing $EVC_n$ is corrected to the retard side so as to decrease the heat of air-fuel mixture $Q_n$ in the current cycle closer to the heat of air-fuel mixture $Q_{n-1}$ in the previous cycle.

On the other hand, when the absolute value $|E_n|$ is larger than the reference value and the ratio of change in heat of air-fuel mixture $E_n$ is the negative value, the heat of air-fuel mixture $Q_n$ in the current cycle changes in such a manner that the heat of air-fuel mixture $Q_n$ significantly decreases from the heat of air-fuel mixture $Q_{n-1}$ in the previous cycle. Specifically, if the exhaust valve 14 is closed still at the current set valve-closing timing $EVC_n$ in the current cycle, the air-fuel mixture temperature at the time of compression becomes lower as compared with that in the previous cycle. As a result, destabilization of the combustion or misfire may occur due to the lack of heat of air-fuel mixture. Therefore, in order to suppress the destabilization of the combustion and the misfire described above, in Step S115, the current set valve-closing timing $EVC_n$ is corrected to the advance side so as to increase the heat of air-fuel mixture $Q_n$ in the current cycle closer to the heat of air-fuel mixture $Q_{n-1}$ in the previous cycle.

Further, the processing of updating the current set valve-closing timing $EVC_n$ by the correction in Step S114 or S115 and the processing in Steps S103 to S110 after the update of the current set valve-closing timing $EVC_n$ are repeated until it is determined in Step S110 that the absolute value $|E_n|$ is equal to or smaller than the reference value (specifically, YES). Therefore, ultimately, the set valve-closing timing $EVC_n$ with the absolute value $|E_n|$ being equal to or smaller than the reference value is obtained. In other words, the set valve-closing timing $EVC_n$ with the change rate of the heat of air-fuel mixture at the time of compression over the previous and current cycles, which falls within an allowable range, is obtained.

In Step S111, the optimum value of exhaust valve close (EVC) timing deriving section 104 derives the current set valve-closing timing $EVC_n$ as the optimum value of exhaust valve close (EVC) timing. Then, the processing proceeds to Step S112. After Step S111 is executed, the variable valve control section 105 controls the exhaust-valve control device 16 so that the exhaust valve 14 is closed at the optimum value of exhaust valve close (EVC) timing derived in the current cycle.

In Step S112, the optimum value of exhaust valve close (EVC) timing deriving section 104 stores the heat of air-fuel mixture $Q_n$, which is calculated in Step S108 when the optimum value of exhaust valve close (EVC) timing is derived in Step S111, as a heat of air-fuel mixture $Q_{n-1}$ in the memory section 106 so as to prepare for control in the subsequent cycle. Then, the series of processing in the current cycle is terminated. As described above, by storing the heat of air-fuel mixture $Q_n$ corresponding to the optimum value of exhaust valve close (EVC) timing derived in the current cycle in the memory section 106, the heat of air-fuel mixture $Q_n$ is used for the execution of the processing in Step S109 in the subsequent cycle.

As described above, the optimum value of exhaust valve close (EVC) timing deriving section 104 included in the control device for an internal combustion engine repeats valve-closing timing correction processing corresponding to the processing in Steps S114 and S115, and the heat of air-fuel mixture calculating processing and the ratio of change in heat of air-fuel mixture calculating processing, which use the corrected set valve-closing timing. As a result, the optimum value of exhaust valve close (EVC) timing, which allows the ratio of change in heat of air-fuel mixture to fall within the allowable range, can be derived.

The preset reference value can be appropriately designed, specifically, for example, can be designed by experimentally finding a proper value for specifications of each internal combustion engine that is a target to be controlled. In particular, as a result of an experiment with the application of the present invention to an actual internal combustion engine by the inventors of the present invention, it is confirmed that it is desired that the reference value be designed to be a value in a range of from 3% to 10%.

The correction amount for the correction of the current set valve-closing timing to the retard side or the advance side can be appropriately set, specifically, for example, can be designed by experimentally finding a proper value for specifications of each internal combustion engine that is a target to be controlled.

As described above, according to the first embodiment, the configuration is provided, which is capable of properly controlling the valve-closing timing of the exhaust valve for adjusting the internal EGR gas amount based on the ratio of change in heat of air-fuel mixture that is the index indicating how the heat of air-fuel mixture in the previous cycle changes in the current cycle.

Specifically, the following configuration is provided. The determination processing for determining whether or not the ratio of change in heat of air-fuel mixture falls within the preset allowable range is executed. When it is determined that the ratio of change in heat of air-fuel mixture falls within the allowable range, the current set valve-closing timing is derived as the optimum value of exhaust valve close (EVC) timing. On the other hand, when it is determined that the ratio of change in heat of air-fuel mixture does not fall within the allowable range, the corrected set valve-closing timing is derived by correcting the current set valve-closing timing in such a manner that the ratio of change in heat of air-fuel mixture falls within the allowable range. Then, the optimization processing for updating the current set valve-closing timing as the corrected set valve-closing timing is executed. Until it is determined that the ratio of change in heat of air-fuel mixture falls within the allowable range, the heat of air-fuel mixture calculating processing, the ratio of change in heat of air-fuel mixture calculating processing, the determination processing, and the optimization processing are repeatedly executed.

Further, when the absolute value of the ratio of change in heat of air-fuel mixture is equal to or smaller than the preset reference value that is equal to or larger than 0%, it is determined that the ratio of change in heat of air-fuel mixture falls within the allowable range. When the absolute value of the ratio of change in heat of air-fuel mixture is larger than the reference value and the ratio of change in heat of air-fuel mixture is positive, it is determined that the ratio of change in heat of air-fuel mixture does not fall within the allowable range and the current set valve-closing timing is corrected to the retard side. When the absolute value of the ratio of change in heat of air-fuel mixture is larger than the reference value and the ratio of change in heat of air-fuel mixture is negative, it is determined that the ratio of change in heat of air-fuel mixture does not fall within the allowable range and the current set valve-closing timing is corrected to the advance side.

In this manner, a constantly stable combustion state, specifically, a constantly stable shaft output of the internal combustion engine can be obtained. Therefore, the occurrence of knocking due to an excessively increased temperature of the air-fuel mixture at the time of compression and the occurrence of misfire due to an excessively lowered temperature of the air-fuel mixture at the time of compression can be suppressed. Further, the constantly stable combustion state can be maintained without lowering output responsiveness as the internal combustion engine.

Second Embodiment

In the first embodiment described above, the case where the optimum value of exhaust valve close (EVC) timing for allowing the absolute value of the ratio of change in heat of air-fuel mixture to become equal to or smaller than the reference value is derived is described. On the other hand, in a second embodiment of the present invention, the following configuration is described. Specifically, the heat of air-fuel mixture in the previous cycle is adjusted so as to be increased or decreased in the current cycle in accordance with a magnitude relationship between the combustion load in the previous cycle and that in the current cycle. In addition, the optimum value of exhaust valve close (EVC) timing for allowing the absolute value of the ratio of change in heat of air-fuel mixture to become equal to or smaller than the reference value is derived.

Here, as compared with a case of a steady combustion with a small combustion load, the temperature of the internal EGR gas remaining in the combustion chamber 5 and the exhaust gas temperature of the combustion gas flowing through the exhaust pipe 23 are generally high in a case of a steady combustion with a large combustion load. Thus, the internal EGR gas amount to be left in the combustion chamber 5 is required to be reduced by correcting the valve-closing timing of the exhaust valve 14 to the retard side so as to prevent the air-fuel mixture temperature from becoming excessively high.

In a transient state in which the combustion state with the small combustion load changes to the combustion state with the large combustion load, the combustion gas at a low temperature, which is derived in a state in which the combustion load is small, remains in the combustion chamber 5 as the internal EGR gas. Therefore, as compared with the case of the steady combustion with the large combustion load, the air-fuel mixture temperature tends to be lower.

Therefore, as a result of a keen examination through an experiment conducted by the inventor of the present invention in view of the consideration described above, the following is clarified. In the transient state in which the combustion load increases as described above, the air-fuel mixture temperature is required to be properly controlled to be in a high state by performing the control so that the heat of air-fuel mixture $Q_n$ in the current cycle after the combustion load changes increases within the allowable range from the heat of air-fuel mixture $Q_{n-1}$ in the previous cycle before the combustion load changes.

On the other hand, in the transient state in which the combustion load decreases, the air-fuel mixture temperature is required to be properly controlled so as not to be excessively increased by performing the control so that the heat of air-fuel mixture $Q_n$ in the current cycle after the combustion load changes decreases within the allowable range from the heat of air-fuel mixture $Q_{n-1}$ in the previous cycle before the combustion load changes.

Therefore, in the second embodiment, the optimum value of exhaust valve close (EVC) timing is derived in consideration of the change in combustion load between the previous cycle and the current cycle in addition to the ratio of change in heat of air-fuel mixture.

Figure 3A:
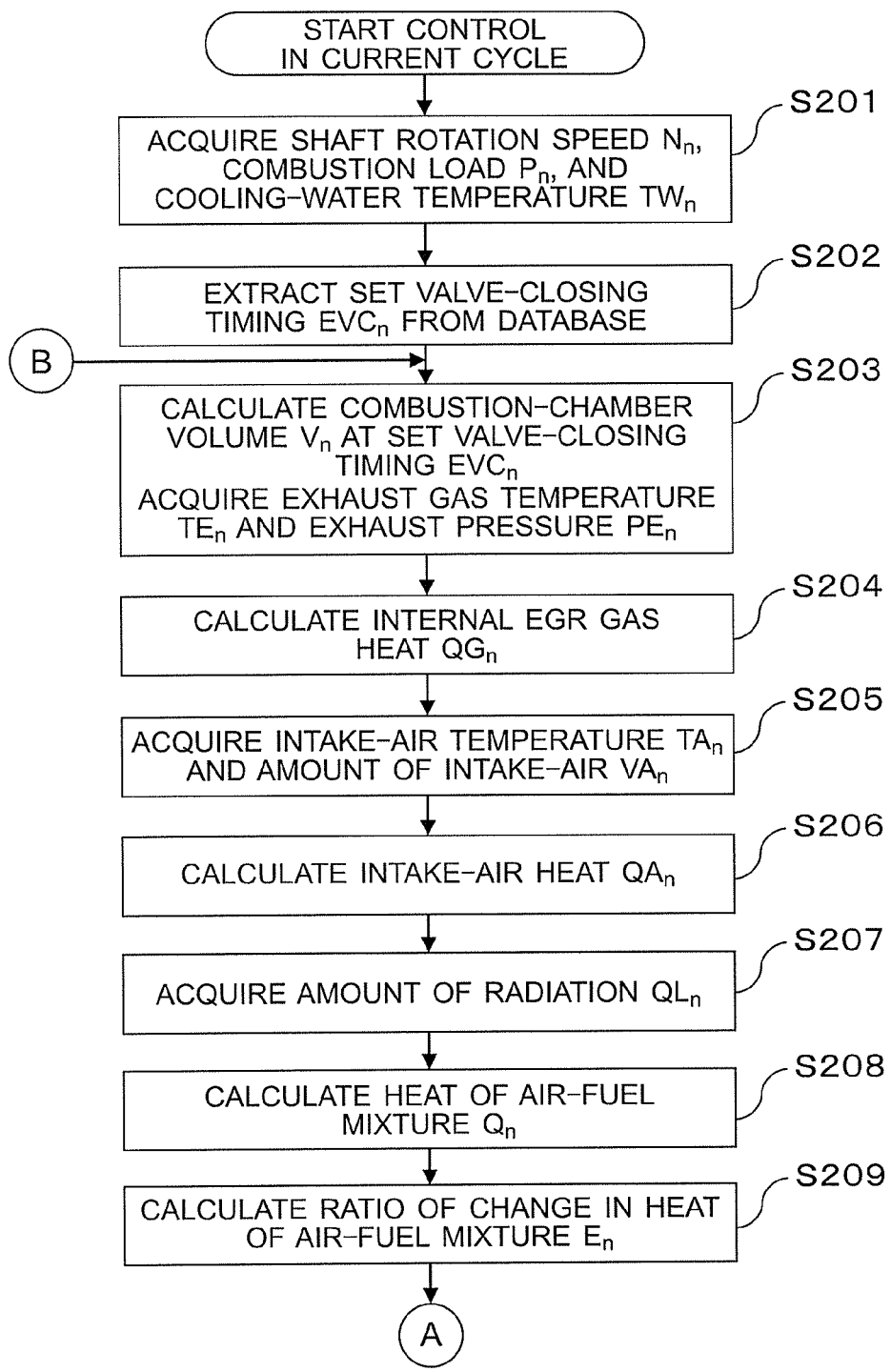
FIG. 3A is a flowchart illustrating an operation of a control device for an internal combustion engine according to a second embodiment of the present invention.

Next, a control device for an internal combustion engine according to the second embodiment is described referring to FIGS. 3A and 3B. FIGS. 3A and 3B are flowcharts illustrating an operation of the control device for an internal combustion engine according to the second embodiment of the present invention. A configuration of the internal combustion engine according to the second embodiment is the same as that described above in the first embodiment described above, and therefore the detailed description thereof is herein omitted. FIGS. 3A and 3B illustrate a single flowchart divided into two parts. Thus, the flowchart of FIG. 3A and the flowchart of FIG. 3B are continuous.

The control device for an internal combustion engine according to the second embodiment sequentially executes Steps S201 to S209. Contents of processing in Steps S201 to S209 are the same as those in Steps S101 to S109 in the first embodiment described above, and therefore the detailed description thereof is herein omitted.

After the control in the current cycle is started, Steps S201 to S209 are sequentially executed. Thereafter, Step S210 is executed.

In Step S210, the optimum value of exhaust valve close (EVC) timing deriving section 104 determines whether or not the combustion load $P_n$ acquired in Step S201 in the current cycle is equal to or larger than the combustion load $P_{n-1}$ acquired in Step S201 in the previous cycle. Specifically, in Step S210, it is confirmed how the combustion load in the current cycle changes from that in the previous cycle.

In Step S210, when the optimum value of exhaust valve close (EVC) timing deriving section 104 determines that the combustion load $P_n$ is equal to or larger than the combustion load $P_{n-1}$ (specifically, YES), the processing proceeds to Step S211. On the other hand, when the optimum value of exhaust valve close (EVC) timing deriving section 104 determines that the combustion load $P_n$ is smaller than the combustion load $P_{n-1}$ (specifically, NO), the processing proceeds to Step S217.

In Step S211, the optimum value of exhaust valve close (EVC) timing deriving section 104 determines whether or not the ratio of change in heat of air-fuel mixture $E_n$ is equal to or larger than 0%. When the optimum value of exhaust valve close (EVC) timing deriving section 104 determines in Step S211 that the ratio of change in heat of air-fuel mixture $E_n$ is equal to or larger than 0% (specifically, YES), the processing proceeds to Step S212. On the other hand, when the optimum value of exhaust valve close (EVC) timing deriving section 104 determines that the ratio of change in heat of air-fuel mixture $E_n$ is smaller than 0% (specifically, NO), the processing proceeds to Step S216.

In Step S212, the optimum value of exhaust valve close (EVC) timing deriving section 104 then determines whether or not the absolute value $|E_n|$ is equal to or smaller than the reference value. When the optimum value of exhaust valve close (EVC) timing deriving section 104 determines in Step S212 that the absolute value $|E_n|$ is equal to or smaller than the reference value (specifically, YES), the processing proceeds to Step S213. On the other hand, when the optimum value of exhaust valve close (EVC) timing deriving section 104 determines that the absolute value $|E_n|$ is larger than the reference value (specifically, NO), the processing proceeds to Step S215.

In Step S215, the optimum value of exhaust valve close (EVC) timing deriving section 104 corrects the current set valve-closing timing $EVC_n$ to the retard side. Then, the processing returns to Step S203. In this case, after the current set valve-closing timing $EVC_n$ is updated by being replaced by the set valve-closing timing $EVC_n$ corrected to the retard side as described above, the processing after Step S203 is executed again. Specifically, the processing after Step S203 is executed again by using the set valve-closing timing $EVC_n$ updated by the correction to the retard side as described above.

As described above, when the absolute value $|E_n|$ is larger than the reference value and the ratio of change in heat of air-fuel mixture $E_n$ is a positive value in the case where the combustion load in the current cycle increases as compared with that in the previous cycle, the heat of air-fuel mixture $Q_n$ in the current cycle changes in such a manner that the heat of air-fuel mixture $Q_n$ significantly increases from the heat of air-fuel mixture $Q_{n-1}$ in the previous cycle. Therefore, as in the first embodiment described above, in Step S215, the current set valve-closing timing $EVC_n$ is corrected to the retard side so as to decrease the heat of air-fuel mixture $Q_n$ in the current cycle closer to the heat of air-fuel mixture $Q_{n-1}$ in the previous cycle.

In Step S216, the optimum value of exhaust valve close (EVC) timing deriving section 104 corrects the current set valve-closing timing $EVC_n$ to the advance side. Then, the processing returns to Step S203. In this case, after the current set valve-closing timing $EVC_n$ is updated by being replaced by the set valve-closing timing $EVC_n$ corrected to the advance side as described above, the processing after Step S203 is executed again. Specifically, the processing after Step S203 is executed again by using the set valve-closing timing $EVC_n$ updated by the correction to the advance side as described above.

As described above, when the ratio of change in heat of air-fuel mixture $E_n$ is a negative value in the case where the combustion load in the current cycle increases from that in the previous cycle, the heat of air-fuel mixture $Q_n$ in the current cycle changes in such a manner that the heat of air-fuel mixture $Q_n$ decreases from the heat of air-fuel mixture $Q_{n-1}$ in the previous cycle. Here, when the combustion load in the current cycle increases from that in the previous cycle as described above, the heat of air-fuel mixture $Q_n$ is required to be controlled so as to increase from the heat of air-fuel mixture $Q_{n-1}$ within the allowable range. Therefore, in Step S216, the current set valve-closing timing $EVC_n$ is corrected to the advance side so that the heat of air-fuel mixture $Q_n$ is changed to be increased from the heat of air-fuel mixture $Q_{n-1}$.

In Step S217, the optimum value of exhaust valve close (EVC) timing deriving section 104 determines whether or not the ratio of change in heat of air-fuel mixture $E_n$ is equal to or smaller than 0%. When the optimum value of exhaust valve close (EVC) timing deriving section 104 determines in Step S217 that the ratio of change in heat of air-fuel mixture $E_n$ is equal to or smaller than 0% (specifically, YES), the processing proceeds to Step S218. On the other hand, when the optimum value of exhaust valve close (EVC) timing deriving section 104 determines that the ratio of change in heat of air-fuel mixture $E_n$ is larger than 0% (specifically, NO), the processing proceeds to Step S220.

In Step S218, the optimum value of exhaust valve close (EVC) timing deriving section 104 then determines whether or not the absolute value $|E_n|$ is equal to or smaller than the reference value. When the optimum value of exhaust valve close (EVC) timing deriving section 104 determines in Step S218 that the absolute value $|E_n|$ is equal to or smaller than the reference value (specifically, YES), the processing proceeds to Step S213. On the other hand, when the optimum value of exhaust valve close (EVC) timing deriving section 104 determines that the absolute value $|E_n|$ is larger than the reference value (specifically, NO), the processing proceeds to Step S219.

In Step S219, the optimum value of exhaust valve close (EVC) timing deriving section 104 corrects the current set valve-closing timing $EVC_n$ to the advance side. Then, the processing returns to Step S203. In this case, after the current set valve-closing timing $EVC_n$ is updated by being replaced by the set valve-closing timing $EVC_n$ corrected to the advance side as described above, the processing after Step S203 is executed again. Specifically, the processing after Step S203 is executed again by using the set valve-closing timing $EVC_n$ updated by the correction to the advance side as described above.

As described above, when the absolute value $|E_n|$ is larger than the reference value and the ratio of change in heat of air-fuel mixture $E_n$ is a negative value in the case where the combustion load in the current cycle decreases as compared with that in the previous cycle, the heat of air-fuel mixture $Q_n$ in the current cycle changes in such a manner that the heat of air-fuel mixture $Q_n$ significantly decreases from the heat of air-fuel mixture $Q_{n-1}$ in the previous cycle. Therefore, as in the first embodiment described above, in Step S219, the current set valve-closing timing $EVC_n$ is corrected to the advance side so as to increase the heat of air-fuel mixture $Q_n$ in the current cycle closer to the heat of air-fuel mixture $Q_{n-1}$ in the previous cycle.

In Step S220, the optimum value of exhaust valve close (EVC) timing deriving section 104 corrects the current set valve-closing timing $EVC_n$ to the retard side. Then, the processing returns to Step S203. In this case, after the current set valve-closing timing $EVC_n$ is updated by being replaced by the set valve-closing timing $EVC_n$ corrected to the retard side as described above, the processing after Step S203 is executed again. Specifically, the processing after Step S203 is executed again by using the set valve-closing timing $EVC_n$ updated by the correction to the retard side as described above.

As described above, when the ratio of change in heat of air-fuel mixture $E_n$ is a positive value in the case where the combustion load in the current cycle decreases from that in the previous cycle, the heat of air-fuel mixture $Q_n$ in the current cycle changes in such a manner that the heat of air-fuel mixture $Q_n$ increases from the heat of air-fuel mixture $Q_{n-1}$ in the previous cycle. Here, when the combustion load in the current cycle decreases from that in the previous cycle as described above, the heat of air-fuel mixture $Q_n$ is required to be controlled so as to decrease within the allowable range. Therefore, in Step S220, the current set valve-closing timing $EVC_n$ is corrected to the retard side so that the heat of air-fuel mixture $Q_n$ is changed to be decreased from the heat of air-fuel mixture $Q_{n-1}$.

In Steps S213 and S214, the same processing as that in Steps S111 and S112 of the first embodiment described above is performed. Thereafter, the series of processing in the current cycle is terminated.

As described above, the optimum value of exhaust valve close (EVC) timing deriving section 104 included in the control device for an internal combustion engine repeats the valve-closing timing correction processing corresponding to the processing in Steps S215, S216, S219, and S220, and the heat of air-fuel mixture calculating processing and the ratio of change in heat of air-fuel mixture calculating processing, which use the corrected set valve-closing timing. As a result, the optimum value of exhaust valve close (EVC) timing, which allows the ratio of change in heat of air-fuel mixture to fall within the allowable range and is derived also in consideration of the change in combustion load between the previous cycle and the current cycle, can be derived.

In the second embodiment, the preset reference value can be appropriately set as in the first embodiment described above, and it is desired that the reference value be designed to be a value in a range of from 3% to 10%.

Moreover, the correction amount for the correction of the current set valve-closing timing to the retard side or the advance side can be appropriately set, specifically, for example, can be designed by experimentally finding a proper value for specifications of each internal combustion engine that is a target to be controlled.

As described above, according to the second embodiment, in contrast to the first embodiment described above, the configuration is provided, which operates as follows when the combustion load acquired in the current cycle is equal to or larger than the combustion load acquired in the previous cycle. Specifically, the configuration is provided, for determining that the ratio of change in heat of air-fuel mixture falls within the allowable range when the ratio of change in heat of air-fuel mixture is 0% or larger and the absolute value of the ratio of change in heat of air-fuel mixture is equal to or smaller than the preset reference value that is equal to or larger than 0%. Further, the configuration determines that the ratio of change in heat of air-fuel mixture does not fall within the allowable range when the ratio of change in heat of air-fuel mixture is 0% or larger and the absolute value of the ratio of change in heat of air-fuel mixture is larger than the preset reference value, and then the configuration corrects the current set valve-closing timing to the retard side. Further, the configuration determines that the ratio of change in heat of air-fuel mixture does not fall within the allowable range when the ratio of change in heat of air-fuel mixture is smaller than 0%, and then the configuration corrects the current set valve-closing timing to the advance side.

Further, the configuration is provided, which operates as follows when the combustion load acquired in the current cycle is smaller than the combustion load acquired in the previous cycle. Specifically, the configuration is provided, for determining that the ratio of change in heat of air-fuel mixture falls within the allowable range when the ratio of change in heat of air-fuel mixture is equal to or smaller than 0% and the absolute value of the ratio of change in heat of air-fuel mixture is equal to or smaller than the preset reference value that is equal to or larger than 0%. Further, the configuration determines that the ratio of change in heat of air-fuel mixture does not fall within the allowable range when the ratio of change in heat of air-fuel mixture is 0% or smaller and the absolute value of the ratio of change in heat of air-fuel mixture is larger than the preset reference value, and then the configuration corrects the current set valve-closing timing to the advance side. Further, the configuration determines that the ratio of change in heat of air-fuel mixture does not fall within the allowable range when the ratio of change in heat of air-fuel mixture is larger than 0%, and then the configuration corrects the current set valve-closing timing to the retard side.

In the manner described above, as compared with the first embodiment described above, a more stable combustion state, that is, a more stable shaft output of the internal combustion engine can be obtained. Therefore, the occurrence of knocking due to pre-ignition and the occurrence of misfire can be further suppressed.

In the first and second embodiments described above, the case where the present invention is applied to the internal combustion engine with the spark ignition control is exemplarily described. However, the internal combustion engine to which the present invention is applied is not limited thereto. The present invention can be applied to an internal combustion engine without spark ignition control (for example, an internal combustion engine operated by compression self-ignition combustion).

It is conceivable that the air-fuel mixture temperature is also affected by a difference in temperature of the intake air or the like when the present invention is applied to the internal combustion engine mounted in the vehicle. Therefore, for example, the combustion reaction rate or combustion stability may be obtained by using the in-cylinder pressure sensor 22 provided to the combustion chamber 5 so that the valve-closing timing of the exhaust valve 14 is corrected by additionally taking the obtained results into consideration.

What is claimed is:

1. A control device for an internal combustion engine, which is configured to control a variable valve control mechanism capable of changing a valve-closing timing of an exhaust valve and controlling the variable valve control mechanism so that the exhaust valve is closed at an optimum value of exhaust valve close (EVC) timing derived by optimizing a set valve-closing timing of the exhaust valve for each cycle, the control device comprising:

a parameter acquiring section configured to acquire an exhaust gas temperature, an exhaust pressure, an intake-air temperature, and an amount of intake-air of the internal combustion engine;

a heat of air-fuel mixture calculating section configured to execute first processing of calculating a heat of an air-fuel mixture as a heat of air-fuel mixture based on a relationship between an internal EGR gas heat and an intake-air heat, the internal EGR gas heat being calculated by calculating a combustion-chamber volume in accordance with a current set valve-closing timing, and calculating a heat of an internal EGR gas present in a combustion chamber based on a relationship between the calculated combustion-chamber volume, and the exhaust gas temperature and the exhaust pressure acquired by the parameter acquiring section, the intake-air heat being calculated by calculating a heat of intake air based on a relationship between the intake-air temperature and the amount of intake-air acquired by the parameter acquiring section;

a ratio of change in heat of air-fuel mixture calculating section configured to execute second processing of calculating a ratio of change in heat of air-fuel mixture, the ratio of change in heat of air-fuel mixture being an index indicating how the heat of air-fuel mixture that is calculated by the heat of air-fuel mixture calculating section so as to correspond to the current set valve-closing timing in a current cycle changes from a heat of air-fuel mixture corresponding to an optimum value of exhaust valve close (EVC) timing derived in a previous cycle; and an optimum value of exhaust valve close (EVC) timing deriving section configured to execute third processing of determining whether or not the ratio of change in heat of air-fuel mixture falls within a preset allowable range, and execute fourth processing of deriving the current set valve-closing timing as the optimum value of exhaust valve close (EVC) timing in the current cycle when it is determined that the ratio of change in heat of air-fuel mixture falls within the allowable range, and deriving a corrected set valve-closing timing by correcting the current set valve-closing timing so that the ratio of change in heat of air-fuel mixture falls within the allowable range to update the current set valve-closing timing as the corrected set valve-closing timing when it is determined that the ratio of change in heat of air-fuel mixture does not fall within the allowable range, wherein the first processing executed by the heat of air-fuel mixture calculating section, the second processing executed by the ratio of change in heat of air-fuel mixture calculating section, and the third processing and the fourth processing executed by the optimum value of exhaust valve close (EVC) timing deriving section are repeatedly executed until it is determined that the ratio of change in heat of air-fuel mixture falls within the allowable range by using the updated current set valve-closing timing.

2. A control device for an internal combustion engine according to claim 1, wherein the optimum value of exhaust valve close (EVC) timing deriving section executes the third processing and the fourth processing by:

determining that the ratio of change in heat of air-fuel mixture falls within the allowable range when an absolute value of the ratio of change in heat of air-fuel mixture is equal to or smaller than a preset reference value that is equal to or larger than 0%;

determining that the ratio of change in heat of air-fuel mixture does not fall within the allowable range when the absolute value of the ratio of change in heat of air-fuel mixture is larger than the reference value and the ratio of change in heat of air-fuel mixture is positive, followed by correcting the current set valve-closing timing to a retard side; and determining that the ratio of change in heat of air-fuel mixture does not fall within the allowable range when the absolute value of the ratio of change in heat of air-fuel mixture is larger than the reference value and the ratio of change in heat of air-fuel mixture is negative, followed by correcting the current set valve-closing timing to an advance side.

3. A control device for an internal combustion engine according to claim 1, wherein the parameter acquiring section further acquires a load of the internal combustion engine, and wherein, in a case where the load acquired in the current cycle is equal to or larger than the load acquired in the previous cycle, the optimum value of exhaust valve close (EVC) timing deriving section executes the third processing and the fourth processing by:

determining that the ratio of change in heat of air-fuel mixture falls within the allowable range when the ratio of change in heat of air-fuel mixture is equal to or larger than 0% and an absolute value of the ratio of change in heat of air-fuel mixture is equal to or smaller than a preset reference value that is equal to or larger than 0%;

determining that the ratio of change in heat of air-fuel mixture does not fall within the allowable range when the ratio of change in heat of air-fuel mixture is equal to or larger than 0% and the absolute value of the ratio of change in heat of air-fuel mixture is larger than the reference value, followed by correcting the current set valve-closing timing to a retard side; and determining that the ratio of change in heat of air-fuel mixture does not fall within the allowable range when the ratio of change in heat of air-fuel mixture is smaller than 0%, followed by correcting the current set valve-closing timing to an advance side.

4. A control device for an internal combustion engine according to claim 1, wherein the parameter acquiring section further acquires a load of the internal combustion engine, and wherein, in a case where the load acquired in the current cycle is smaller than the load acquired in the previous cycle, the optimum value of exhaust valve close (EVC) timing deriving section executes the third processing and the fourth processing by:

determining that the ratio of change in heat of air-fuel mixture falls within the allowable range when the ratio of change in heat of air-fuel mixture is equal to or smaller than 0% and an absolute value of the ratio of change in heat of air-fuel mixture is equal to or smaller than a preset reference value that is equal to or larger than 0%;

determining that the ratio of change in heat of air-fuel mixture does not fall within the allowable range when the ratio of change in heat of air-fuel mixture is equal to or smaller than 0% and the absolute value of the ratio of change in heat of air-fuel mixture is larger than the reference value, followed by correcting the current set valve-closing timing to an advance side; and determining that the ratio of change in heat of air-fuel mixture does not fall within the allowable range when the ratio of change in heat of air-fuel mixture is larger than 0%, followed by correcting the current set valve-closing timing to a retard side.

5. A control device for an internal combustion engine according to claim 1,
wherein the parameter acquiring section further acquires an amount of radiation from the air-fuel mixture, and
wherein the heat of air-fuel mixture calculating section executes the first processing by calculating the heat of air-fuel mixture based on a relationship among the amount of radiation, the internal EGR gas heat, and the intake-air heat.

6. A control device for an internal combustion engine according to claim 2,
wherein the parameter acquiring section further acquires an amount of radiation from the air-fuel mixture, and
wherein the heat of air-fuel mixture calculating section executes the first processing by calculating the heat of air-fuel mixture based on a relationship among the amount of radiation, the internal EGR gas heat, and the intake-air heat.

7. A control device for an internal combustion engine according to claim 3,
wherein the parameter acquiring section further acquires an amount of radiation from the air-fuel mixture, and
wherein the heat of air-fuel mixture calculating section executes the first processing by calculating the heat of air-fuel mixture based on a relationship among the amount of radiation, the internal EGR gas heat, and the intake-air heat.

8. A control device for an internal combustion engine according to claim 4,
wherein the parameter acquiring section further acquires an amount of radiation from the air-fuel mixture, and
wherein the heat of air-fuel mixture calculating section executes the first processing by calculating the heat of air-fuel mixture based on a relationship among the amount of radiation, the internal EGR gas heat, and the intake-air heat.

9. A control device for an internal combustion engine according to claim 5, wherein the parameter acquiring section acquires the amount of radiation by estimating the amount of radiation based on a relationship between a flow rate of cooling water for cooling the internal combustion engine and a difference between a temperature of the cooling water before cooling the internal combustion engine and a temperature of the cooling water after cooling the internal combustion engine.

10. A control device for an internal combustion engine according to claim 2, wherein the reference value is a value that is equal to or larger than 3% and equal to or smaller than 10%.

11. A control device for an internal combustion engine according to claim 3, wherein the reference value is a value that is equal to or larger than 3% and equal to or smaller than 10%.

12. A control device for an internal combustion engine according to claim 4, wherein the reference value is a value that is equal to or larger than 3% and equal to or smaller than 10%.

* * * * *